US012669932B2

(12) United States Patent
Jiang et al.

(10) Patent No.: US 12,669,932 B2
(45) Date of Patent: Jun. 30, 2026

(54) DATA BLOCK DISTRIBUTION IN HYBRID STORAGE SYSTEMS

(71) Applicant: ZHEJIANG DAHUA TECHNOLOGY CO., LTD., Hangzhou (CN)

(72) Inventors: Wenlong Jiang, Hangzhou (CN); Yaofei Kou, Hangzhou (CN); Zhihao Wang, Hangzhou (CN); Xin Luo, Hangzhou (CN); Mingwei Zhou, Hangzhou (CN); Wenjun Li, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 5 days.

(21) Appl. No.: 18/621,045

(22) Filed: Mar. 28, 2024

(65) Prior Publication Data

US 2024/0241640 A1    Jul. 18, 2024

Related U.S. Application Data

(63) Continuation of application No. PCT/CN2022/122683, filed on Sep. 29, 2022.

(30) Foreign Application Priority Data

Sep. 29, 2021    (CN) .......................... 202111147391.6

(51) Int. Cl.
*G06F 3/06* (2006.01)

(52) U.S. Cl.
CPC ............ *G06F 3/0604* (2013.01); *G06F 3/064* (2013.01)

(58) Field of Classification Search
CPC ....... G06F 3/0604; G06F 3/064; G06F 3/0689
See application file for complete search history.

(56) References Cited

U.S. PATENT DOCUMENTS 10,872,622 B1 * 12/2020 Li .......................... G06F 3/0649
2015/0177999 A1 * 6/2015 Gakhal ................. G06F 16/178
709/213

(Continued)

FOREIGN PATENT DOCUMENTS

CN        105357294 A    2/2016
CN        105550362 A    5/2016

(Continued)

OTHER PUBLICATIONS

International Search Report in PCT/CN2022/122683 mailed on Dec. 22, 2022, 5 pages.

(Continued)

*Primary Examiner* — Arpan P. Savla
*Assistant Examiner* — Jason Michael Pinga
(74) *Attorney, Agent, or Firm* — METIS IP LLC

(57) ABSTRACT

The present disclosure provides methods, systems, devices, and media for data processing. The method may include obtaining information of one or more hard disks of each of one or more data nodes, the information of the one or more hard disks at least including type information, capacity information, and location information of each of the one or more hard disks; determining, based on a data processing instruction and the information of the one or more hard disks, target information of a target hard disk among the one or more hard disks; and transmitting the data processing instruction including the target information of the target hard disk to a target data node corresponding to the target hard disk.

20 Claims, 8 Drawing Sheets

200

(56)     References Cited

U.S. PATENT DOCUMENTS

| | | | | |
|---|---|---|---|---|
| 2017/0090763 A1* | 3/2017 | Horn | ..................... | G06F 3/0676 |
| 2017/0090775 A1* | 3/2017 | Kowles | ................ | G06F 3/0611 |
| 2017/0249551 A1* | 8/2017 | Iljazi | ................. | G06F 11/0781 |
| 2017/0277709 A1* | 9/2017 | Strauss | ................ | G06F 3/0604 |
| 2018/0285294 A1 | 10/2018 | Chagam Reddy | | |
| 2018/0342261 A1* | 11/2018 | Das | ......................... | G11B 5/09 |
| 2020/0213089 A1* | 7/2020 | Yang | .................... | H04L 9/3265 |
| 2021/0258822 A1* | 8/2021 | Mukherjee | ........... | H04L 1/1887 |

FOREIGN PATENT DOCUMENTS

| | | | |
|---|---|---|---|
| CN | 107092439 A | 8/2017 | |
| CN | 107273048 A | 10/2017 | |
| CN | 109753245 A | 5/2019 | |
| CN | 110858122 A | 3/2020 | |
| CN | 111880751 A | 11/2020 | |
| CN | 111897696 A | 11/2020 | |
| CN | 112783448 A | 5/2021 | |
| CN | 113311992 A | 8/2021 | |
| CN | 113885798 A | 1/2022 | |
| DE | 102008012199 A1 | 9/2009 | |
| JP | H0869356 A | 3/1996 | |
| WO | 2020113549 A1 | 6/2020 | |

OTHER PUBLICATIONS

Written Opinion in PCT/CN2022/122683 mailed on Dec. 22, 2022, 7 pages.
The Extended European Search Report in European Application No. 22875094.9 mailed on Nov. 8, 2024, 12 pages.

* cited by examiner

100

<u>200</u>

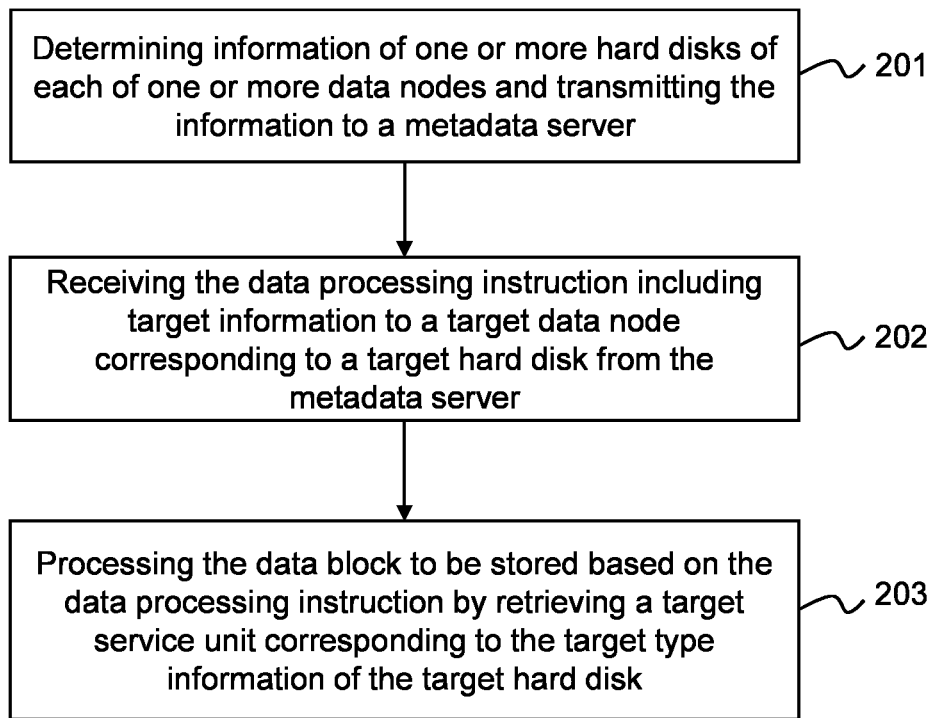

Determining information of one or more hard disks of
each of one or more data nodes and transmitting the
information to a metadata server          201

Receiving the data processing instruction including
target information to a target data node
corresponding to a target hard disk from the
metadata server          202

Processing the data block to be stored based on the
data processing instruction by retrieving a target
service unit corresponding to the target type
information of the target hard disk          203

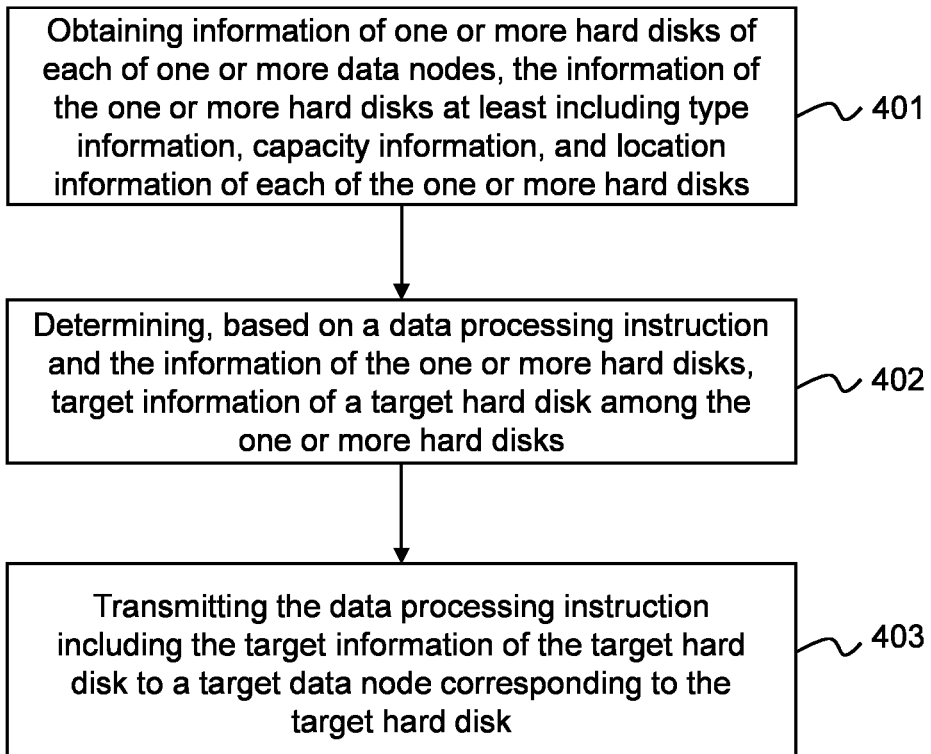

Obtaining information of one or more hard disks of each of one or more data nodes, the information of the one or more hard disks at least including type information, capacity information, and location information of each of the one or more hard disks ～ 401

Determining, based on a data processing instruction and the information of the one or more hard disks, target information of a target hard disk among the one or more hard disks ～ 402

Transmitting the data processing instruction including the target information of the target hard disk to a target data node corresponding to the target hard disk ～ 403

921
RAM

923
ROM

92

91
Processor

922
Cache
Memory

925

924

93

95
I/O Interface

96
Network Adapter

94
External Device

1000

Program
Product

DATA BLOCK DISTRIBUTION IN HYBRID STORAGE SYSTEMS

CROSS-REFERENCE TO RELATED APPLICATIONS

This application is a continuation of International Application No. PCT/CN2022/122683, filed on Sep. 29, 2022, which claims priority of Chinese Patent Application No. 202111147391.6 filed on Sep. 29, 2021, the contents of which are hereby incorporated by reference.

TECHNICAL FIELD

The present disclosure generally relates to data processing techniques, and more particularly, relates to systems, methods, devices, and media for data processing.

BACKGROUND

In video surveillance, a real-time business data flow generated by a front-end video/picture acquisition device needs to be transmitted to a distributed storage cluster. For example, a user file may be divided into a plurality of data blocks with a same size by a metadata server according to a data redundancy strategy, and then a plurality of data nodes may be determined, by the metadata server according to a load balancing strategy, to store the plurality of data blocks. A count (or number) of the plurality of data blocks may be the same as a count (or number) of the plurality of data nodes. Finally, after the plurality of data blocks are received by the plurality of data nodes, a hard disk in each of the plurality of data nodes may be determined, according to the load balancing strategy, to store one of the plurality of data blocks.

In the existing distributed storage cluster, the metadata server is used to maintain information, for example, a name of a user file, names of the plurality of divided data blocks, identity documents (IDs) of the plurality of data nodes where the plurality of data blocks are stored, etc. Each of the plurality of data nodes is used to maintain information, for example, information of a data block and location information of the data block in the hard disk, and manage a space of the hard disk. Fault isolation between data nodes and hard disks can be achieved through the two-layer load balancing. However, a logical redundancy may be in the distributed storage cluster.

With the diversification of security surveillance, data types written into the distributed storage cluster may be increased. Since the metadata server cannot perceive types of hard disks in the data node, different types of business data cannot be delivered to appropriate hard disks.

SUMMARY

The present disclosure provides systems, methods, devices, and media for data processing. A data node may be connected with one or more conventional magnetic recording (CMR) hard disks and one or more shingled magnetic recording (SMR) hard disks, which can achieve the load balancing, data reading, and management at a cluster level, thereby simplifying use of the distributed storage cluster, and reducing the difficulty of cluster deployment and maintenance.

An aspect of the present disclosure relates to a method for data processing implemented on a computing device having at least one processor and at least one storage device. The method may include obtaining information of one or more hard disks of each of one or more data nodes. The information of the one or more hard disks may at least include type information, capacity information, and location information of each of the one or more hard disks. The method may include determining, based on a data processing instruction and the information of the one or more hard disks, target information of a target hard disk among the one or more hard disks. The method may further include transmitting the data processing instruction including the target information of the target hard disk to a target data node corresponding to the target hard disk.

In some embodiments, the determining, based on a data processing instruction and the information of the one or more hard disks, target information of a target hard disk among the one or more hard disks may include determining, based on the data processing instruction, a data block to be stored; determining a data file type of the data block to be stored; and determining, based on the data file type of the data block to be stored, the target information of the target hard disk among the one or more hard disks.

In some embodiments, the determining, based on the data file type of the data block to be stored, the target information of the target hard disk among the one or more hard disks may include in response to determining that the data file type of the data block to be stored is a first data file type, determining, based on a priority strategy, a first hard disk as the target hard disk; or in response to determining that the data file type of the data block to be stored is a second data file type, determining, based on the priority strategy, a second hard disk as the target hard disk. The priority strategy may include determining whether capacity information of the first hard disk whose type corresponds to the data file type of the data block satisfies a condition; in response to determining that the capacity information of the first hard disk satisfies the condition, designating the first hard disk as the target hard disk; or in response to determining that the capacity information of the first hard disk whose type corresponds to the data file type of the data block does not satisfy the condition, designating the second hard disk whose type does not correspond to the data file type as the target hard disk.

In some embodiments, the priority strategy may include at least one of a node allocating strategy or a hard disk issuing strategy.

In some embodiments, a life cycle of the data block in the first data file type may not be fixed and capacity occupation of the data block in the first data file type may not exceed a threshold. A life cycle of the data block in the second data file type may be fixed and capacity occupation of the data block in the second data file type may exceed the threshold. The first hard disk may be a CMR hard disk, and the second hard disk may be a SMR hard disk.

In some embodiments, the data processing instruction may include a data storage instruction. The method may further include determining whether the data block to be stored is stored in the target hard disk; and in response to determining that the data block to be stored is not stored in the target hard disk, updating the data storage instruction by replacing the target hard disk with another hard disk whose type does not correspond to the data file type.

In some embodiments, the method may further include in response to determining that the data block to be stored is stored in a hard disk, obtaining location information of the hard disk where the data block is stored; and establishing, based on the location information of the hard disk corresponding to the data block, a relationship table including a name of a data file, a name of the data block, and the location information of the hard disk.

In some embodiments, the computing device may be connected with a metadata server.

Another aspect of the present disclosure relates to a system for data processing. The system may include at least one storage device including a set of instructions; and at least one processor in communication with the at least one storage device, wherein when executing the set of instructions. The at least one processor may be directed to perform operations including obtaining information of one or more hard disks of each of one or more data nodes, the information of the one or more hard disks at least including type information, capacity information, and location information of each of the one or more hard disks; determining, based on a data processing instruction and the information of the one or more hard disks, target information of a target hard disk among the one or more hard disks; and transmitting the data processing instruction including the target information of the target hard disk to a target data node corresponding to the target hard disk.

Still another aspect of the present disclosure relates to a device for data processing. The device may include an information obtaining module, a determination module, and a transmission module. The information obtaining module may be configured to obtain information of one or more hard disks of each of one or more data nodes. The information of the one or more hard disks may at least include type information, capacity information, and location information of each of the one or more hard disks. The determination module may be configured to determine, based on a data processing instruction and the information of the one or more hard disks, target information of a target hard disk among the one or more hard disks. The transmission module may be configured to transmit the data processing instruction including the target information of the target hard disk to a target data node corresponding to the target hard disk.

Still a further aspect of the present disclosure relates to a non-transitory computer readable medium, comprising executable instructions that, when executed by at least one processor, direct the at least one processor to perform a method. The method may include obtaining information of one or more hard disks of each of one or more data nodes, the information of the one or more hard disks at least including type information, capacity information, and location information of each of the one or more hard disks; determining, based on a data processing instruction and the information of the one or more hard disks, target information of a target hard disk among the one or more hard disks; and transmitting the data processing instruction including the target information of the target hard disk to a target data node corresponding to the target hard disk.

An aspect of the present disclosure relates to a method for data processing implemented on a computing device having at least one processor and at least one storage device. The method may include receiving a data processing instruction including target information of a target data node corresponding to a target hard disk. The method may further include determining, based on the data processing instruction, the target hard disk in the target data node.

In some embodiments, the receiving a data processing instruction including target information to a target data node corresponding to a target hard disk may include determining information of one or more hard disks of each of one or more data nodes, the information of the one or more hard disks at least including type information, capacity information, and location information of each of the one or more hard disks; transmitting the information of the one or more hard disks of each of the one or more data nodes to a metadata server; and receiving the data processing instruction including the target information to the target data node corresponding to the target hard disk from the metadata server In some embodiments, before the determining, based on the data processing instruction, the target hard disk in the target data node, the method may include determining, based on the data processing instruction, target type information of the target hard disk; and determining, based on the target type information and a relationship between type information of hard disks and service units, a target service unit corresponding to the target type information.

In some embodiments, the method may further include obtaining a data block to be stored; and processing, based on the data processing instruction, the data block to be stored by retrieving the target service unit corresponding to the target type information.

In some embodiments, the data processing instruction may include a data storage instruction. The method may further include determining, based on the data storage instruction, the target hard disk where the data block in the data storage instruction is stored; and determining, based on the target type information of the target hard disk, the target service unit to store the data block.

In some embodiments, the method may further include determining whether the data block to be stored is stored in the target hard disk; and in response to determining that the data block to be stored is not stored in the target hard disk, obtaining an updated data storage instruction including replacing the target hard disk with another hard disk whose type does not correspond to a data file type of the data block.

In some embodiments, the method may further include in response to determining that the data block to be stored is stored in a hard disk, obtaining location information of the hard disk; and transmitting the location information of the hard disk to the metadata server.

In some embodiments, the determining, based on the target type information and a relationship between type information of hard disks and service units, a target service unit corresponding to the target type information may include in response to determining that the target type information is a CMR hard disk, determining a service unit of the CMR hard disk to be associated with the target hard disk; or in response to determining that the target type information is a SMR hard disk, determining a service unit of the SMR hard disk to be associated with the target hard disk.

Another aspect of the present disclosure relates to a system for data processing. The system may include at least one storage device including a set of instructions; and at least one processor in communication with the at least one storage device, wherein when executing the set of instructions. The at least one processor may be directed to perform operations including receiving a data processing instruction including target information of a target data node corresponding to a target hard disk; and determining, based on the data processing instruction, the target hard disk in the target data node.

Still another aspect of the present disclosure relates to a device for data processing. The device may include an instruction receiving module and a determination module. The instruction receiving module may be configured to receive a data processing instruction including target information of a target data node corresponding to a target hard disk. The determination module may be configured to determine, based on the data processing instruction, the target hard disk in the target data node.

Still a further aspect of the present disclosure relates to a non-transitory computer readable medium, comprising executable instructions that, when executed by at least one processor, direct the at least one processor to perform a method. The method may include receiving a data processing instruction including target information of a target data node corresponding to a target hard disk; and determining, based on the data processing instruction, the target hard disk in the target data node.

According to some embodiments of the present disclosure, the management capability of SMR hard disks may be added for data nodes. The data node may be connected with one or more CMR hard disks and one or more SMR hard disks. Therefore, no physical isolation may be needed during cluster deployment, which can reduce the maintenance difficulty of the distributed storage cluster.

The data node may transmit the type information of one or more hard disks connected with the data node to the metadata server. The metadata server may be used to maintain information, for example, a name of a user file, names of the plurality of divided data blocks, identity documents (IDs) of the plurality of data nodes where the plurality of data blocks are stored, etc. Therefore, the availability of the distributed storage cluster in various business scenarios and the writing performance of the data nodes may be improved, and the waste of resources to maintain multiple data relationships may be reduced.

After the data node transmits the type information of the one or more hard disks to the metadata server, the distributed storage cluster may determine an appropriate storage medium when the business data with different life cycles are processed, which can rationally utilize the cluster capacity, improve the performance of reading and writing, and reduce the difficulty of data management and space recycling.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2 is a flowchart illustrating an exemplary process for data processing according to some embodiments of the present disclosure;

FIG. 4 is a flowchart illustrating an exemplary process for data processing according to some embodiments of the present disclosure;

DETAILED DESCRIPTION

Figure 1:
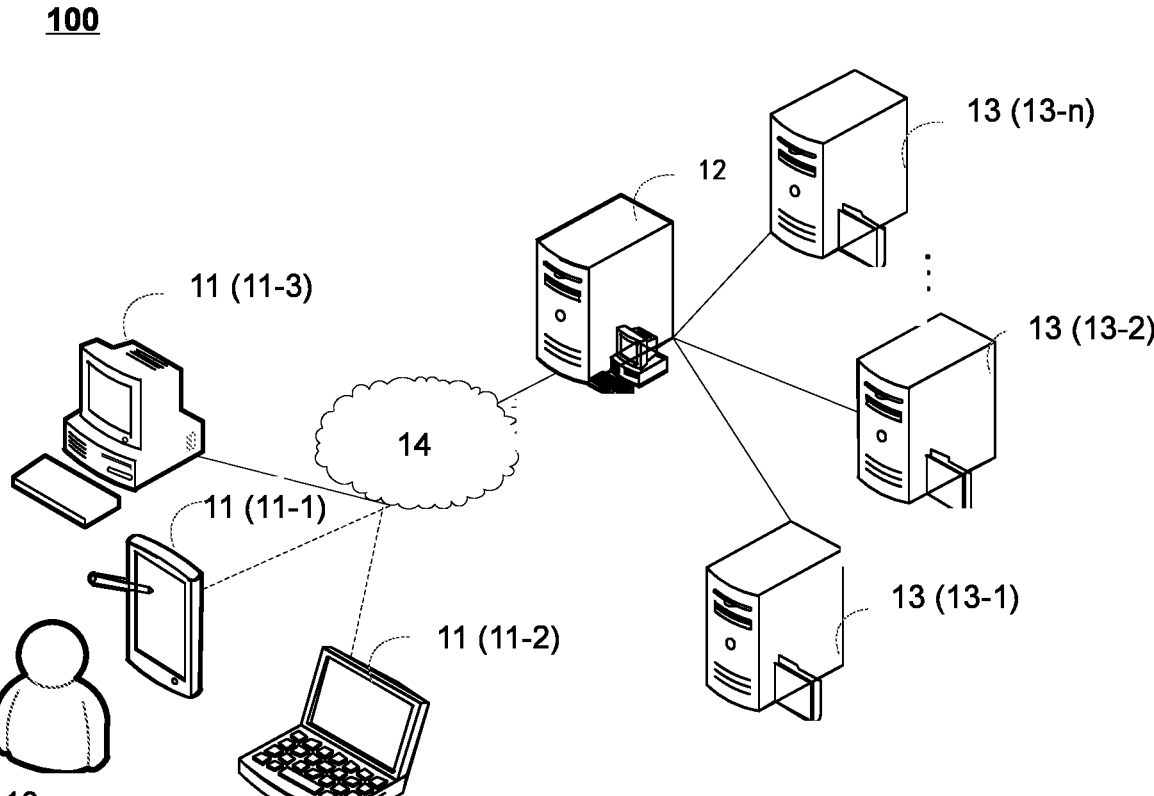
FIG. 1 is a schematic diagram illustrating an exemplary data processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms ("a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The term "CMR hard disk" in some embodiments of the present disclosure is a mechanical hard disk using a conventional magnetic recording. It belongs to a current mainstream mechanical hard disk medium. The CMR hard disk may be used to support random reading, writing, and deletion, which can construct a common file system and manage hard disk files. However, a capacity of the CMR hard disk is small. After the common file system is used, a certain read and write bandwidth is occupied, which can reduce the performance of the order.

The term "SMR hard disk" in some embodiments of the present disclosure is a high cost-effective hard disk with a large capacity. A storage density of the SMR hard disk is increased by reducing the sector interval. The SMR hard disk may be used to support continuous reading, writing, deletion, and random reading, but not support random writing and deletion. The business layer of the SMR hard disk is required to perform continuous writing and deletion of the entire zone data in units of zones. A length of a current zone length is 256 mega bytes (MB). A capacity of the SMR hard disk is large. In a scenario written in order, the performance of the SMR hard disk is better than the performance of the CMR hard disk. However, since random writing and deletion are not supported, the common file system cannot be used to manage hard disk files of the SMR hard disk. In a scenario where a life cycle of the file is not fixed, the capacity recycling of the SMR hard disk can occupy a large system resource, which can reduce the performance of reading and writing.

The term "distributed storage cluster" in some embodiments of the present disclosure is a cluster for data processing through multiple servers. The distributed storage cluster may be implemented in many forms. In the present disclosure, the distributed storage cluster refers to a distributed storage cluster including a metadata server, one or more data nodes, and one or more hard disks. The metadata server is responsible for managing the one or more data nodes in the distributed storage cluster and maintaining a distribution relation of user data. Each of the one or more data nodes is responsible for managing the one or more large-capacity mechanical hard disks. In the present disclosure, the one or more mechanical hard disks may refer to SMR and CMR hard disks connected to the one or more data nodes, and store data block storage information to a designated position of the SMR and CMR hard disks.

The term "data block" in some embodiments of the present disclosure refers to "data block storage information." The data block refers to data stored in a hard disk of a data node after a data file of a user is divided. When the business layer reads and writes the data file, the data redundancy strategy supported by the metadata server needs to be performed. Therefore, an original data file of the user may be divided into a plurality of data blocks with a same size, and then stored into corresponding hard disks in a plurality of data nodes. Alternatively, after the plurality of data blocks are read from the corresponding hard disks in the plurality of data nodes, the data file of the user may be restored according to the data redundancy strategy.

The term "life cycle of user data files" is a count of hours that the data file can be stored in the distributed storage cluster. In order to quickly and conveniently use the distributed storage cluster in the field of security video surveillance, a life cycle may be set for each data file when the distributed storage cluster is connected with a front video/picture business. Once a stored time of the data file exceeds the life cycle set by the user, the distributed storage cluster may actively delete the data file when the capacity of the distributed storage cluster is insufficient, thereby reusing the storage space.

In the existing distributed storage cluster, the metadata server is used to maintain information, for example, a name of a user file, names of the plurality of divided data blocks, identity documents (IDs) of the plurality of data nodes where the plurality of data blocks are stored, etc. Each of the plurality of data nodes is used to maintain information, for example, information of a data block and location information of the data block in the hard disk, and manage a space of the hard disk. Fault isolation between data nodes and hard disks can be achieved through the two-layer load balancing. However, a logical redundancy may be in the distributed storage cluster.

With the diversification of security surveillance, data types written into the distributed storage cluster may be increased. Since the metadata server cannot perceive types of hard disks in the data node, different types of business data cannot be delivered to appropriate hard disks.

In order to solve the above problems, the present disclosure provides systems, methods, devices, and media for data processing. A data node may be connected with different types of hard disks, which can achieve the load balancing, data reading, and management at a cluster level, thereby simplifying the use of the distributed storage cluster, and reducing the difficulty of cluster deployment and maintenance.

FIG. 1 is a schematic diagram illustrating an exemplary data processing system according to some embodiments of the present disclosure. As shown in FIG. 1, a data processing system 100 may include a user device 11, a metadata server 12, and one or more data nodes 13. A user 10 may log in the metadata server 12 in a storage system with a distributed storage cluster through a client software installed in the user device 11. The client software may include a browser of a webpage, an application client installed in a mobile user device (e.g., a mobile phone, a tablet, etc.), etc.

The user device 11 and the metadata server 12 may be communicated through the network. The network may include a local area network, a wide area network, etc. The user device 11 may include a convenient device (e.g., a mobile phone 11-1, a tablet, a laptop 11-2, etc.), a personal computer (PC) 11-3, etc. The metadata server 12 may be any device that can provide an Internet service.

A form of the communication between the user device 11 and the metadata server 12 may be that the user 10 may log in a corresponding data processing platform, a data processing instruction of the user may be transmitted to the metadata server 12 through a communication network 14, and the one or more data nodes 13 (e.g., a data node 13-1, a data node 13-2, . . . , a data node 13-n) connected with the metadata server 12 may perform the data processing based on the data processing instruction.

In some embodiments of the present disclosure, the one or more data nodes 13 may receive the data processing instruction including target information of a target data node corresponding to a target hard disk, and determine the target hard disk in the target data node based on the data processing instruction. For example, the one or more data nodes 13 may determine information of one or more hard disks of each of the one or more data nodes 13 and transmit the information of the one or more hard disks of the one or more data nodes 13 to the metadata server 12. The information of the one or more hard disks may include type information, capacity information, and location information of each of the one or more hard disks. The one or more data nodes 13 may transmit the information of the one or more hard disks of each of the one or more data nodes 13 to the metadata server 12 and receive the data processing instruction including target information to the target data node among the one or more data nodes 13 corresponding to the target hard disk from the metadata server 12. Further, the one or more data nodes 13 may obtain a data block to be stored, and process the data block to be stored by retrieving a target service unit corresponding to target type information based on the data processing instruction.

The metadata server 12 may obtain the information of the one or more hard disks of each of one or more data nodes 13. The information of the one or more hard disks may at least include type information, capacity information, and location information of each of the one or more hard disks. The metadata server 12 may determine, based on the data processing instruction and the information of the one or more hard disks, the target information of the target hard disk among the one or more hard disks. The metadata server 12 may further transmit the data processing instruction including the target information of the target hard disk to the target data node among the one or more data nodes 13 corresponding to the target hard disk.

According to some embodiments of the present disclosure, a method for data processing is provided. Based on a same idea, the present disclosure further provides a device, a device, and a computer readable medium for data processing.

Embodiment 1

The embodiment provides a method for data processing that is applied to one or more data nodes. Referring to FIG. 2, FIG. 2 is a flowchart illustrating an exemplary process for data processing according to some embodiments of the present disclosure.

In 201, information of one or more hard disks of each of one or more data nodes may be determined and transmitted to a metadata server. The information of the one or more hard disks may include type information, capacity information, location information, or the like, or any combination thereof, of each of the one or more hard disks.

For example, location information of a hard disk may include an identity document (dnID) of a data node where the hard disk is located, an identity document (diskID) assigned by the data node to the hard disk after the hard disk is successfully connected with the data node, or the like, or any combination thereof. The location information of each hard disk may be unique within a distributed storage cluster. The type information may include a type of a hard disk, etc. In some embodiments, one data node may be connected with multiple types of hard disks, and one hard disk may be connected with one data node. Compared with the existing data node that can be connected to hard disks with a same type, no physical isolation needs to be performed during the cluster deployment, which can reduce the maintenance difficulty of the distributed storage cluster.

In 202, the data processing instruction including target information to a target data node corresponding to a target hard disk may be received from the metadata server. The target information may include target type information, target location information, etc., of the target hard disk. For example, the data processing instruction may include the target type information, the target location information, etc., of the target hard disk where a data block is stored.

For example, the data block may be obtained by dividing a data file to be processed. As another example, the data block may be obtained by performing other operations on the data file to be processed. The data processing instruction may include a deletion instruction, a data storage instruction, a data reading instruction, a data writing instruction, or the like, or any combination thereof.

In some embodiments, the data processing instruction may include the target type information, the target location information, etc., of the target hard disk where the data block is stored and relevant information of the data block.

In 203, the data block to be stored may be processed, based on the data processing instruction, by retrieving a target service unit corresponding to the target type information of the target hard disk.

For example, the target service unit may refer to a program unit that provides a management manner corresponding to the target type information. The management manner may include hard disk connection, reading, writing, deletion, formatting, or the like, or any combination thereof.

The one or more data nodes in the present disclosure may be connected with different types of hard disks and manage different types of hard disks simultaneously. Hard disks with a same type may be managed by a corresponding service unit. The data node may transmit (e.g., report) the types of hard disks to the metadata server. The data node may shield the difference of data in the hard disks of different types to the business layer, which can reduce the difficulty of system maintenance and facilitate the implementation on-site.

In related technologies, the data block obtained from the data file may be stored in a hard disk directory of the data node in the form of a common file system. The data management manner based on an erasure code may also be implemented based on the form. However, since the SMR hard disk cannot be randomly written and deleted, the common file system cannot be constructed on the SMR hard disk. Therefore, the data node of the existing cluster cannot be connected with the CMR hard disk and SMR hard disk simultaneously.

In some embodiments, before the determining, based on the data processing instruction, the target hard disk in the target data node, the process 200 may further include determining, based on the data processing instruction, target type information of the target hard disk, and determining, based on the target type information and a relationship between type information of hard disks and service units, the target service unit corresponding to the target type information.

For example, when the hard disk is connected with the data node, the information such as the type information, the capacity information, etc., may be transmitted (e.g., reported) to the data node. The data node may determine the type information of the hard disk based on the information. Therefore, the connected hard disk may be associated with the corresponding service unit.

In some embodiments, the type information of the hard disk in the present disclosure may include a CMR hard disk and an SMR hard disk. The determining, based on the target type information and a relationship between type information of hard disks and service units, a target service unit corresponding to the target type information may include in response to determining that the type information is a CMR hard disk, a service unit of the CMR hard disk may be associated with the target hard disk. That is, after the data node perceives the CMR hard disk, the data node may format the CMR hard disk to the common file system. The data block in the business layer may be stored in the hard disk directory for supporting the deletion and space recycling of any files.

In response to determining that the target type information is an SMR hard disk, a service unit of the SMR hard disk may be associated with the target hard disk. That is, when the data node perceives the SMR hard disk, the SMR hard disk may be directly read, written, and managed through the data processing instruction retrieved by the system. In addition, the SMR hard disk may delete the data block and perform the space recycling through the data processing instruction.

Figure 3:
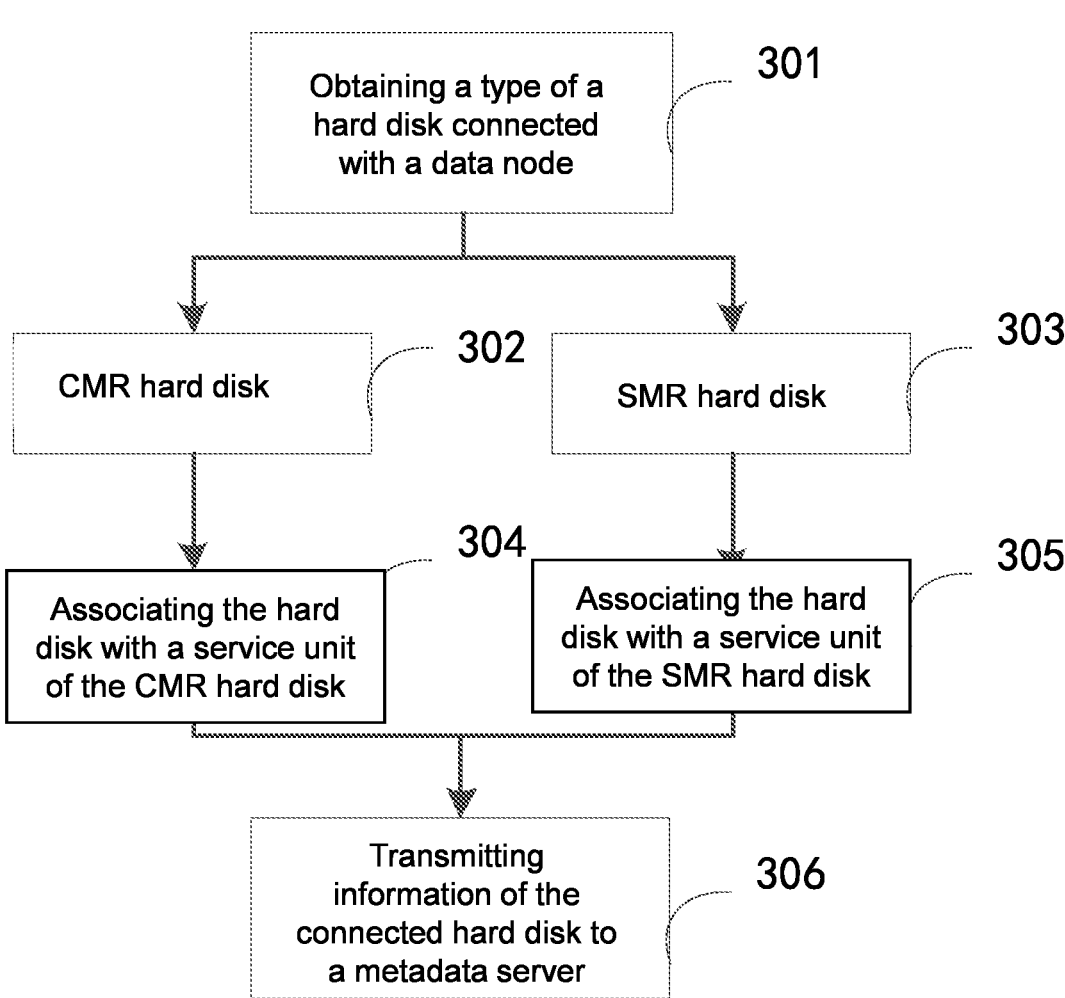
FIG. 3 is a flowchart illustrating an exemplary process for connecting with a hard disk according to some embodiments of the present disclosure.

FIG. 3 is a flowchart illustrating an exemplary process 300 for connecting with a hard disk according to some embodiments of the present disclosure.

In 301, a type of a hard disk connected with a data node may be obtained.

In 302, in response to determining that the connected hard disk is a CMR hard disk, operation 304 may be performed.

In 303, in response to determining that the connected hard disk is an SMR hard disk, operation 305 may be performed.

In 304, the hard disk may be associated with a service unit of the CMR hard disk.

In 305, the hard disk may be associated with a service unit of the SMR hard disk.

In 306, information of the connected hard disk may be transmitted (e.g., reported) to a metadata server.

The data node in some embodiments of the present disclosure may shield the differences between the CMR hard disk management and the SMR hard disk management through a software manner. Therefore, the metadata server may transmit the divided data blocks to a hard disk of any data node and/or any media, which can reduce the maintenance difficulty of the distributed storage cluster.

In some embodiments, the data processing instruction may include a deletion instruction, a data storage instruction, a data reading instruction, a data writing instruction, or the like, or any combination thereof.

For example, when a user transmits a data storage instruction including the data block to be stored, a hard disk where the data block in the data storage instruction is stored may be determined. The service unit corresponding to the hard disk may be determined to store the data block.

For instance, after the data node receives the data storage instruction including the data block to be stored sent by the metadata server, the corresponding hard disk may be determined based on the location information in the data storage instruction. When the data block is stored, different data blocks of a same data file may be distributed in different hard disks.

In some embodiments, after the target service unit to store the data block is determined based on the target type information of the target hard disk, the process 300 may include determining whether the data block to be stored is stored in a hard disk; and in response to determining that the data block to be stored is not stored in the hard disk, an updated data storage instruction may be obtained to store the data block to be stored in another hard disk. The updated data storage instruction may include replacing the target hard disk with another hard disk whose type does not correspond to a data file type of the data block.

In response to determining that the data block to be stored is stored in the hard disk, location information of the hard disk may be obtained and the location information of the hard disk may be transmitted to the metadata server.

For instance, for the SMR hard disk, the location information may include a start address where the data block is stored in the hard disk and a length of the data block. For the CMR hard disk, the location information may include a directory structure and an offset address. The metadata server may establish, based on the location information of the hard disk corresponding to the data block, a relationship table including a name of a data file, a name of the data block, and the location information of the hard disk, thereby managing the data files of the user in the distributed storage cluster.

When the user sends the deletion instruction, the deletion instruction may include information (e.g., the type information and the location information) of the hard disk where the data block to be deleted is stored. A hard disk corresponding to the location information of the hard disk may be determined by using the relationship table of the user file based on the location information of the hard disk where the data block to be deleted is stored. The data block may be deleted based on the corresponding service unit of the type information of the hard disk. After the data block is deleted, updated information of the hard disk may be transmitted to the metadata server, and the metadata server may update relevant content in the relationship table of the user file.

When the user sends a data reading instruction, the data reading instruction may include information (e.g., the type information and the location information) of the hard disk where the data block to be read is stored. A hard disk corresponding to the location information of the hard disk may be determined by using the relationship table of the user file based on the location information of the hard disk where the data block to be read is stored. The data block may be read based on the corresponding service unit of the type information of the hard disk. After the data block is read, updated information of the hard disk may be transmitted to the metadata server, and the metadata server may update relevant content in the relationship table of the user file.

When the user sends a data writing instruction, the data writing instruction may include information (e.g., the type information and the location information) of the hard disk where the data block to be written is stored. A hard disk corresponding to the location information of the hard disk may be determined by using the relationship table of the user file based on the location information of the hard disk where the data block to be written is stored. The data block may be written based on the corresponding service unit of the type information of the hard disk. After the data block is written, updated information of the hard disk may be transmitted to the metadata server, and the metadata server may update relevant content in the relationship table of the user file.

Embodiment 2

The embodiment provides a method for data processing that is applied to a metadata server. Referring to FIG. 4, FIG. 4 is a flowchart illustrating an exemplary process for data processing according to some embodiments of the present disclosure.

In 401, information of one or more hard disks of each of one or more data nodes may be obtained. The information of the one or more hard disks may at least include type information, capacity information, and location information of each of the one or more hard disks. For example, information of one or more hard disks may be reported by one or more data nodes.

In the existing technology, the metadata server cannot perceive the type information of the hard disk connected with the data node. Therefore, different types of data blocks cannot be stored in suitable hard disks. The metadata server in the present disclosure may obtain the information of the one or more hard disks reported by the data node, thereby managing the hard disk.

In 402, target information of a target hard disk among the one or more hard disks may be determined based on a data processing instruction and the information of the one or more hard disks. The target hard disk may refer to a hard disk to be processed.

For example, if the data processing instruction is a data storage instruction, the target information (e.g., target type information and target location information) of the target hard disk among the one or more hard disks may be determined based on a type of a data block to be stored in the data processing instruction. In some embodiments, if the data processing instruction is another data processing instruction (e.g., a data reading instruction, a deletion instruction, etc.), the target type information and the target location information of the target hard disk may be directly determined based on the data processing instruction.

In 403, the data processing instruction including the target information of the target hard disk to a target data node corresponding to the target hard disk may be transmitted to the target data node.

For example, the metadata server may determine a target data node corresponding to the target location information of the target hard disk based on the target location information of the target hard disk, and transmit the data processing instruction to the target data node.

In the present disclosure, after the type information of the hard disk that is connected to the metadata server is transmitted to the metadata server, the distributed storage cluster may determine an appropriate storage medium when data files with different life cycles are processed, which can rationally utilize the cluster capacity, improve the performance of reading and writing, and reduce the difficulty of data management and space recycling.

In the metadata server, the relationship table of the user file may be established based on the location information of the hard disk corresponding to the data block. The relationship table may include a name of a data file, a name of the data block, and the location information of the hard disk. When other operations are performed, the metadata server may retrieve location information of a hard disk corresponding to the data blocks to be processed according to the relationship table of the user file, so that the corresponding operation may be performed.

A picture file may occupy a small capacity of the hard disk and a life cycle of the picture file may not be fixed, which belongs to a first data file type. For example, a life cycle of the data block in the first data file type may not be fixed and capacity occupation of the data block in the first data file type may not exceed a threshold. The data files may be obtained from different business scenarios. The life cycles of the data files may be inconsistent. If the data files are stored in the SMR hard disk, space recycling of the hard disk may be inconvenient. In order to avoid space waste, a lot of resources may be consumed for garbage recycling. Therefore, the picture files with inconsistencies in life cycles may be stored in the CMR hard disk. Once a life cycle of a picture file exceeds a threshold, the picture file may be deleted from the hard disk, and how many picture files are deleted to release the corresponding storage space.

A video file may be continuously written. The life cycle of the video file may be fixed, and the capacity occupation of the hard disk may be large, which belongs to a second data file type. The video files may be stored in the SMR hard disk. When the life cycle of the video file exceeds a threshold, the video file may be deleted by units of zone.

For example, when the metadata server receives a data storage instruction for the resource requested by the user, the picture file may be divided into the data blocks according to a redundant strategy with an erasure code. One or more available hard disk may be determined based on the information of the one or more hard disks of each of the one or more data nodes. The CMR hard disk and the corresponding location information may be determined, based on a priority strategy, among the one or more available hard disks. If an available capacity of the CMR hard disk is smaller than a size of the data block to be stored, the SMR hard disk and the corresponding location information may be determined to store the data block to be stored. As another example, the video file may be divided into the data blocks according to the redundant strategy with the erasure code. One or more available hard disk may be determined based on the information of the one or more hard disks of each of the one or more data nodes. The SMR hard disk and the corresponding location information may be determined, based on the priority strategy, among the one or more available hard disks. If an available capacity of the SMR hard disk is smaller than a size of the data block to be stored, the CMR hard disk and the corresponding location information may be determined to store the data block to be stored.

In some embodiments, the metadata server may receive the data storage instruction for the resource requested by the user. In response to the data storage instruction, the data blocks to be stored may be determined. That is, the data files (e.g., the video files or the picture files) of the user may be divided into data blocks with a same size. Checked data blocks may be determined according to the redundant strategy with the erasure code, and sent to the one or more data nodes for storage. The process may be found in existing processes, which is not repeated herein.

In response to determining that the data file type of the data block to be stored is a first data file type, a first hard disk may be determined, based on the priority strategy, as the target hard disk. Alternatively, in response to determining that the data file type of the data block to be stored is a second data file type, a second hard disk may be determined, based on the priority strategy, as the target hard disk.

The priority strategy may include determining whether capacity information of the first hard disk whose type corresponds to the data file type of the data block satisfies a condition, in response to determining that the capacity information of the first hard disk satisfies the condition, designating the first hard disk as the target hard disk; or in response to determining that the capacity information of the first hard disk whose type corresponds to the data file type of the data block does not satisfy the condition, designating the second hard disk whose type does not correspond to the data file type as the target hard disk. The condition may include that the capacity information of the first hard disk whose type corresponds to the data file type of the data block does not exceed a capacity threshold.

In some embodiments, a life cycle of the data block in the first data file type may be not fixed and capacity occupation of the data block in the first data file type may not exceed a threshold. A life cycle of the data block in the second data file type may be fixed and capacity occupation of the data block in the second data file type may exceed the threshold. The threshold may refer to a minimum capacity of the capacity occupation of the data block in the second data file type. The first hard disk may be a CMR hard disk, and the second hard disk may be an SMR hard disk.

In some embodiments, an appropriate storage medium may be determined when the metadata server processes the data files with different life cycles, which can rationally utilize the cluster capacity, improve the performance of reading and writing, and reduce the difficulty of data management and space recycling.

In some embodiments, a priority strategy may include a node allocating strategy, a hard disk issuing strategy, or the like, or any combination thereof.

The node allocating strategy refers to a strategy used to determine the data node for storing a data block.

In some embodiments, the node allocating strategy may include determining a node priority value of each of one or more data node and determining a target data node based on the node priority value.

The target data node refers to a data node used to store the data block.

The node priority value may be used to indicate the priority level of storing a data block in a data node (in any hard disk in the data node). The node priority value may be represented in numerical or other ways.

In some embodiments, the node priority value of a data node may be determined based on a space usage rate of the data node. For example, the larger the space usage rate of the data node is, the larger the node priority value of the data node may be.

The space usage rate of the data node may be used to describe the usage of the storage space of the data node. The space usage rate of the data node may be a ratio of a sum of the available capacity of one or more hard disks of the data node to the total capacity of the one or more hard disks of the data node.

In some embodiments, the metadata server may determine a data node with the largest node priority value as the target data node.

In some embodiments, the node allocating strategy may include determining a node selection probability of each of one or more data nodes and determining the target data node based on the node selection probability.

The node selection probability of a data node refers to the probability of the data node being selected as the target data node. The node selection probability may be represented in value (e.g., decimals from 0~1) or in other ways.

In some embodiments, the node selection probability of a data node may be determined based on the node priority value of the data node. For example, the larger the node priority value of the data node is, the larger the node selection probability of the data node may be.

In some embodiments, the node selection probability of a data node may be determined based on the node priority value of the data node and a similarity coefficient of the data node.

The similarity coefficient of a data node may be used to describe the similarity degree between data features of the data stored in the data node and data features of the data block to be stored. The larger the similarity degree of the data features of the data stored in the data node and the data features of the data block to be stored is, the larger the similarity coefficient of the data node may be.

The data features may include a business type, a life cycle, a format type, and a data size. The business type refers to a type of the business to which the data block belongs. For example, the type of the business may include, such as public place monitoring, road monitoring, or the like. The format type refers to a type of the format of the data file to which the data block belongs. For example, the format type may include, such as video stream, picture, or the like.

In some embodiments, the data features of the data stored in the data node may be the average of the data features of the data blocks stored in the data node.

In some embodiments, the data features of the data stored in the data node or the data features of the data block to be stored may be denoted as a data feature vector.

In some embodiments, the distance between a data feature vector of the data stored in the data node and a data feature vector of the data block to be stored may be determined, and the similarity coefficient of the data node may be determined based on the distance between the data feature vector of the data stored in the data node and the data feature vector of the data block to be stored. For example, the smaller the distance between the data feature vector of the data stored in the data node and the data feature vector of the data block to be stored is, the larger the similarity coefficient of the data node may be. The data feature vector may be obtained by converting all non-numeric values in the data features into numeric values. For example, the business type in the data feature may be converted into a numeric number through classification and thus converted into a numeric value.

In some embodiments, the node selection probability of a data node may be determined based on the node priority value and the similarity coefficient according to the following equation (1):

$$p = \frac{s_k a_k}{\sum_{i=1}^{N} s_i a_i}, \tag{1}$$

where p denotes the node selection probability of the data node, $a_k$ denotes the node priority value of the k-th data node, $s_k$ denotes the similarity coefficient of the k-th data node, $a_i$ denotes the node priority value of the i-th data node, $s_i$ denotes the similarity coefficient of the i-th data node, and N denotes the number of data nodes in the distributed cluster.

In some embodiments, a data node among multiple data nodes may be selected and determined as the target data node based on different probability selections. For example, if there are two data nodes A and B in a distributed cluster, and the node selection probabilities of data nodes A and B are 60% and 40%, respectively. In some embodiments, data node A may be selected as the target data node with a probability of 60% by a random number generation algorithm or other random algorithms. In some embodiments, data node B may be selected as the target data node with a probability of 40%.

In some embodiments, the node allocating strategy may include determining one or more points on the load ring corresponding to each of the data nodes (also referred to as corresponding points of the data node) and a point on the load ring corresponding to the data block to be stored (also referred to as corresponding point of the data block), and determining the target data node based on the corresponding points on the load ring according to a preset rule.

The load ring of a data node may be used to solve the storage load of data nodes and may include a ring data structure including several points. The ring data structure refers to a structure obtained by the circular arrangement of data. For example, the 12-hour time scales of a circular clock may form a ring data structure including 12 points. The points included in the load ring may be determined based on a preset. In some embodiments, the load ring may include enough points with no repeating and continuous values (e.g., continuous positive integers). For example, the load ring may be a ring data structure obtained by arranging $2^{32}$ points from a value 1 to a value $2^{32}$ in a clockwise/counterclockwise or any other manner.

In some embodiments, the corresponding points of the data nodes on the load ring may be determined based on a hash function. Take the determination of the corresponding points of the data nodes on the load ring as an example, a certain feature (such as IP address) of a data node is used as input based on the hash function, and value A is output. Take the modulo of value A according to the maximum value contained in the load ring (for example, take the modulo by $2^{32}$) to obtain value B, and take the point corresponding to value B on the load ring as the corresponding point of the data node on the load ring. The manner of determining the corresponding point of the data block to be stored on the load ring may be similar to the preceding process. The feature input in the hash function may be a certain feature of the data block to be stored (for example, a binary code sequence formed by the entire data block).

In some embodiments, a count of the corresponding points of a data node on the load ring may exceed 1. The multiple points corresponding to the data node on the load ring may be obtained based on multiple features (e.g., IP address, hostname, host number, etc.) of the data node, respectively, through the manner mentioned above of determining a single corresponding point or other similar manners.

In some embodiments, the number of the corresponding points of the data node on the load ring may be determined based on the space usage rate of the data node and the average space usage rate of the data node. The average space usage rate of the data node refers to the average of the space usage rate of the data nodes of the data nodes in the distributed storage cluster. The greater the extent that the space usage rate of the data node of the data node is larger than the average space usage rate of the data node is, the smaller the number of the corresponding points of the data node on the load ring may be. The greater the extent that the space usage rate of the data node of the data node is smaller than the average space usage rate of the data node is, the larger the number of the corresponding point of the data node on the load ring may be.

The preset rule may be determined in any reasonable way. In some embodiments, the preset rule may include starting from a corresponding point of a data block to be stored on the load ring, traversing the points on the load ring in a certain order (for example, clockwise/counterclockwise), and determining a data node corresponding to the corresponding point traversed at first on the load ring as the target data node.

In some embodiments, the priority strategy may include a hard disk issuing strategy. The hard disk issuing strategy refers to a strategy used to determine certain available hard disk in a data node for storing the data block.

The available hard disk refers to a hard disk in the data node that meets at least a storage condition. For example, the storage condition may include the capacity of the hard disk being greater than the size of the data block to be stored.

In some embodiments, the hard disk issuing strategy may include determining a priority value of each of the one or more hard disks in the target data node, and determining a target hard disk and the corresponding location information of the target hard disk.

The target hard disk refers to a hard disk corresponding to the data block to be stored. The target hard disk may be a hard disk where the data block may be stored.

The priority value of the hard disk may be used to indicate the priority degree of storing the data block in the hard disk. The priority value of the hard disk may be represented in numerical or other ways.

In some embodiments, the priority value of a hard disk may be determined based on the available capacity of the hard disk and the read and write load of the hard disk (e.g., the number of reads and writes per second). For example, the larger the available capacity of the hard disk is and the smaller the read and write load of the hard disk is, the larger the priority value of the hard disk may be.

In some embodiments, the priority value of a hard disk may also be related to the data increment of the hard disk. For example, the smaller the data increment of the hard disk is, the larger the priority value of the hard disk may be. The data increment of the hard disk refers to the amount of data newly stored in the hard disk within a preset time period (for example, the last 30 minutes).

In some embodiments, in response to the type of the data block to be stored as a first data file type, the priority value of a hard disk may be related to the fragmentation rate of the hard disk. For example, the lower the fragmentation rate of the hard disk is, the larger the priority value of the hard disk may be.

The fragmentation rate of a hard disk refers to a proportion of file fragmentation in the hard disk. File fragmentation refers to scattered sub-files generated because the file is scattered and saved to different places on the hard disk. The fragmentation rate of a hard disk may be the ratio of the capacity of the file fragmentation to the total capacity of the hard disk.

In some embodiments, the priority value of a hard disk may be obtained by weighting, based on a weight vector, the available capacity of the hard disk, the read and write load of the hard disk, the data increment of the hard disk, and the fragmentation rate of the hard disk. The weight vector may include four elements including the weight of the available capacity of the hard disk, the weight of the read and write load of the hard disk, the weight of the data increment of the hard disk, and the weight of the fragmentation rate of the hard disk. When the type of the data block to be stored is the second data file type, the weight of the fragmentation rate of the hard disk in the weight vector may be 0. The weight vector may be determined based on experience.

In some embodiments, the weight vector may be determined based on a weight determination model.

The input of the weight determination model may include scale information and load information, and the output may include a weight vector.

The scale information refers to information related to the scale of the distributed storage cluster. The scale information may include the number of data nodes of the distributed storage cluster, the total number of hard disks of the distributed storage cluster, the total capacity of hard disks of the distributed storage cluster, or the like.

The load information refers to the information related to loads of the distributed storage cluster. The load information may include the average usage of one or more CPUs, the average usage of memory, IOPS (INPUT/OUTPUT Operations Per Second, the number of reads and writes per second), or the like.

In some embodiments, the weight determination model may be obtained through training. For example, training samples may be input into an initial weight determination model, a loss function may be constructed based on the output of the initial weight determination model determined by an initial weight of the initial weight determination model, and the initial weight of the initial weight determination model may iteratively updated based on the loss function to determine the parameters of the initial weight determination model until a preset termination condition is satisfied and the training is completed.

In some embodiments, the training samples may include historical scale information and historical load information. The labels may be the weight vectors corresponding to the historical scale information and historical load information. The training samples and the labels may be obtained based on historical data. In some embodiments, the labels of the training samples may be determined based on the operation stability of the system (e.g., the number of days that the system continuously operates steadily) and the operation efficiency of the system (e.g., the average rate of the read and write of the hard disk). In some embodiments, a weight vector corresponding to a training sample with high operation stability and high operation efficiency may be determined as the label of the training sample.

In some embodiments, the metadata server may determine the hard disk as the target hard disk with the maximum priority value and obtain the corresponding location information of the hard disk.

After determining the target data node and the target hard disk, the metadata server may send a storing operation instruction including the data block to be stored to the target data node. The storing operation instruction may contain the location information of the target hard disk.

In some embodiments, the data operation instructions include the data storage instruction including the data block to be stored. After the target information of the target hard disk among the one or more hard disks is determined based on the data file type of the data block to be stored, the process 400 may further include determining whether the data block to be stored is stored in the target hard disk; and in response to determining that the data block to be stored is not stored in the target hard disk, updating the data storage instruction by replacing the target hard disk with another hard disk whose type does not correspond to the data file type.

For example, the data node may feedback the location information of the hard disk corresponding to the data block that is not successfully stored and the data block that is not successfully stored. The metadata server may receive the data block that is not successfully stored feedback from the data node to determine the data block that is not successfully stored. The metadata server may receive the position information of the hard disk corresponding to the data block feedback by the data node to determine a position of the hard disk that is not successfully stored with the data block. The metadata server may determine other hard disks with the same type except the hard disk on the data node or hard disks with the same type on other data nodes. For example, a data file may be a picture file that belongs to the first data file type. If there is a data block that is not successfully stored in data blocks of the picture file, the metadata server may determine other CMR hard disks on the original data node or CMR hard disks on other data nodes to store the data block that is not successfully stored. As another example, a data file may be a video file that belongs to the second data file type. If there is a data block that is not successfully stored in data blocks of the video file, the metadata server may determine other SMR hard disks on the original data node or SMR hard disks on other data nodes to store the data block that is not successfully stored.

In some embodiments, in response to determining that the data block to be stored is stored in a hard disk, location information of the hard disk where the data block is stored may be obtained. A relationship table may be established based on the location information of the hard disk corresponding to the data block feedback by the data node. The relationship table may include a name of a data file, a name of the data block, and the location information of the hard disk.

Figure 5:
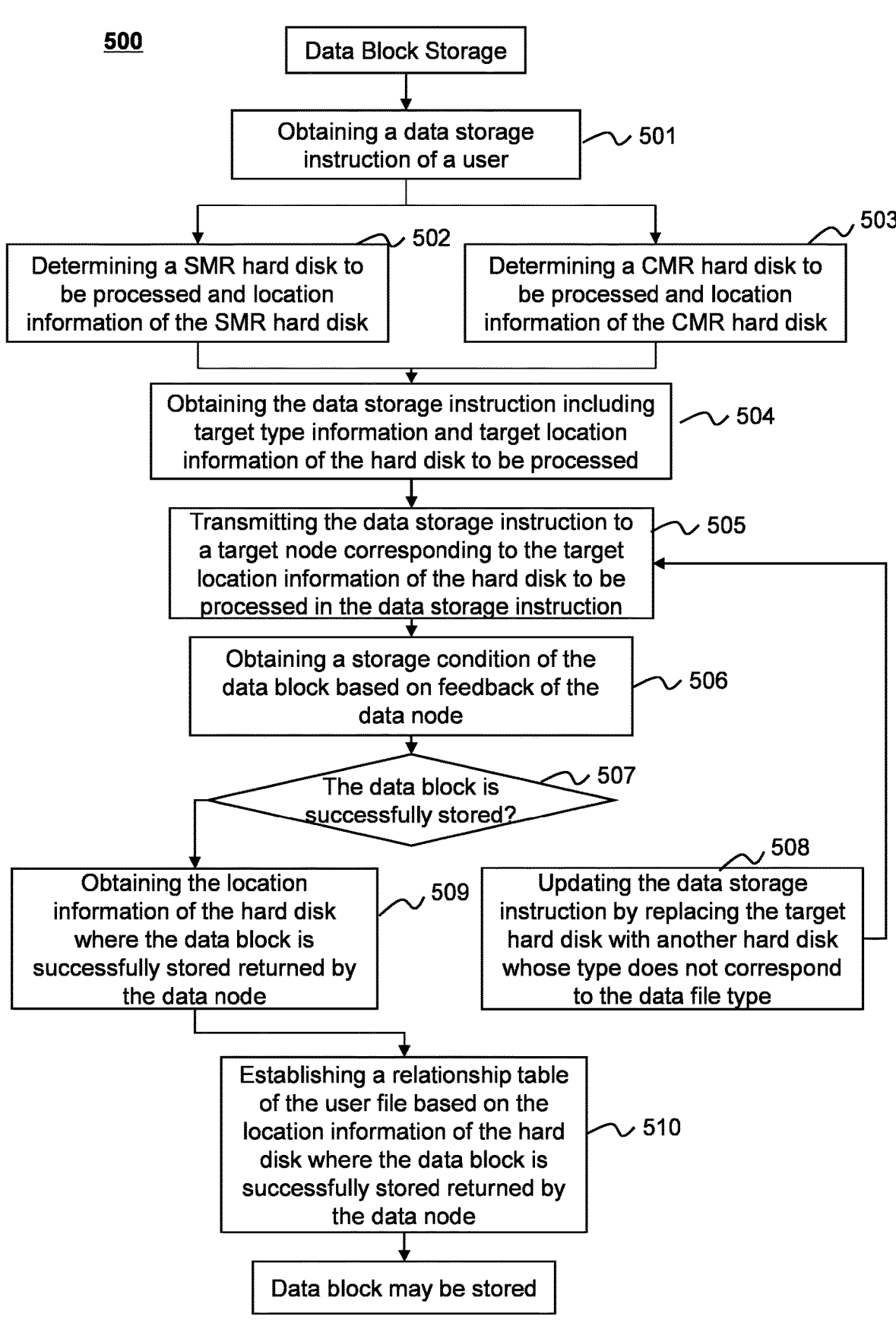
FIG. 5 is a flowchart illustrating an exemplary process for storing a data block according to some embodiments of the present disclosure.

FIG. 5 is a flowchart illustrating an exemplary process 500 for storing a data block according to some embodiments of the present disclosure. As shown in FIG. 5, the process 500 may include following operations.

In 501, a data storage instruction of a user may be obtained. The data storage instruction may include information of data blocks of a data file of the user.

In 502, if the data file is a second data file type, such as a video file, an SMR hard disk to be processed and location information of the SMR hard disk may be determined.

In 503, if the data file is a first data file type, such as a picture file, a CMR hard disk to be processed and location information of the CMR hard disk may be determined.

In 504, the data storage instruction including target type information and target location information of the hard disk to be processed may be obtained. The data storage instruction may further include relevant information of the data blocks of the data file of the user.

In 505, the data storage instruction may be transmitted to a target node corresponding to the target location information of the hard disk to be processed in the data storage instruction.

In 506, a storage condition of the data block may be obtained based on feedback from the data node.

In 507, whether the data block is successfully stored may be determined. If the data block is not successfully stored, operation 508 may be performed. If the data block is successfully stored, operations 509-510 may be performed.

In 508, the data storage instruction may be updated by replacing the target hard disk with another hard disk whose type does not correspond to the data file type.

In 509, the location information of the hard disk where the data block is successfully stored returned by the data node may be obtained.

In 510, a relationship table of the user file may be established based on the location information of the hard disk where the data block is successfully stored feedback from the data node.

In the existing distributed storage cluster, the metadata server and the one or more data nodes need to be responsible for data management.

Therefore, to meet the data redundancy with the erasure code, the one or more data nodes in the distributed storage cluster need to meet a certain count. Otherwise, the metadata server may not determine the appropriate data node when a certain redundancy is required. For example, when a certain count of the one or more data nodes is less than 7, 7+2 data redundancy cannot be performed.

In addition, the metadata server and the one or more data nodes need to perform a check of the load balancing and data redundancy. That is, different data blocks of a same user file may be distributed in different storage media, which has a certain degree of logical redundancy, and increase a system load of the one or more data nodes.

According to some embodiments in the present disclosure, only the metadata server is responsible for performing a load balancing strategy at the cluster level. A hard disk with a large surplus capacity and a small 10 pressure may be determined priority to store the data blocks. After the data block is successfully stored, the metadata server can establish the relationship table of the user file according to the location information of the hard disk corresponding to the data block returned by the data node to manage the data files of the user in the distributed storage cluster.

In a scenario with a small cluster and a small count of data nodes, as long as the count of hard disks is sufficient, the data redundancy with the erasure code may be satisfied, thereby improving the availability of the distributed storage cluster in multiple business scenarios. By integrating the pressure of the redundancy checking on the user data and the load balancing strategy of the hard disk by the data nodes into the metadata server with stronger performance and more system resources, the writing performance of the data node may be improved, and the waste of resources to maintain multiple data relationships may be reduced.

Embodiment 3

Based on the same invention idea, some embodiments of the present disclosure also provide a device 600 for data processing. Since the device 600 is the device in the method for data processing according to some embodiments of the present disclosure, and the principle of solving the problem of the device 600 is similar to that of the method for data processing, the device 600 may be referred to the implementation of the method, which is not repeated.

Figure 6:
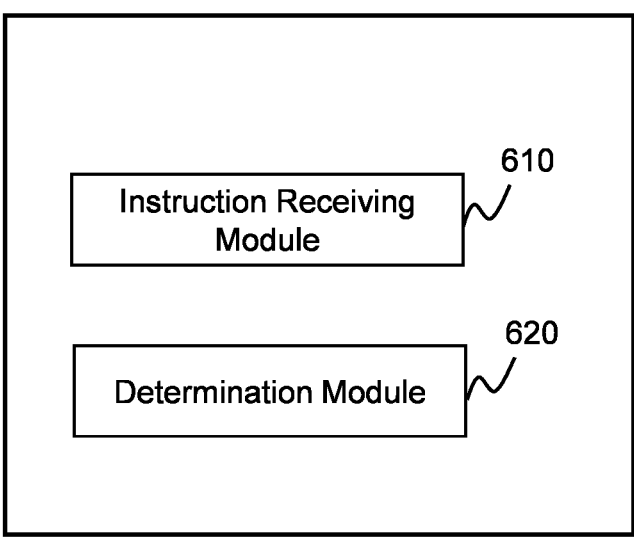
FIG. 6 is a block diagram illustrating an exemplary device for data processing according to some embodiments of the present disclosure.

FIG. 6 is a block diagram illustrating an exemplary device for data processing according to some embodiments of the present disclosure.

As shown in FIG. 6, the device 600 may include an instruction receiving module 610 and a determination module 620.

The instruction receiving module 610 may be configured to receive a data processing instruction including target information of a target data node corresponding to a target hard disk.

The determination module 620 may be configured to determine, based on the data processing instruction, the target hard disk in the target data node.

In some embodiments, the instruction receiving module 610 may determine information of one or more hard disks of each of one or more data nodes. The information of the one or more hard disks may at least include type information, capacity information, and location information of each of the one or more hard disks. In some embodiments, the instruction receiving module 610 may transmit the information of the one or more hard disks of each of the one or more data nodes to a metadata server and receive the data processing instruction including the target information to the target data node corresponding to the target hard disk from the metadata server.

In some embodiments, before the determining, based on the data processing instruction, the target hard disk in the target data node, the instruction receiving module 610 may determine target type information of the target hard disk based on the data processing instruction, and determine a target service unit corresponding to the target type information based on the target type information and a relationship between type information of hard disks and service units.

In some embodiments, the determination module 620 may obtain a data block to be stored, and process the data block to be stored by retrieving the target service unit corresponding to the target type information based on the data processing instruction.

In some embodiments, the data processing instruction may include a data storage instruction. The determination module 620 may determine the target hard disk where the data block in the data storage instruction is stored based on the data storage instruction, and determine the target service unit to store the data block based on the target type information of the target hard disk.

In some embodiments, the determination module 620 may determine whether the data block to be stored is stored in the target hard disk. In response to determining that the data block to be stored is not stored in the target hard disk, the determination module 620 may obtain an updated data storage instruction including replacing the target hard disk with another hard disk whose type does not correspond to a data file type of the data block.

In some embodiments, in response to determining that the data block to be stored is stored in a hard disk, the determination module 620 may obtain location information of the hard disk, and transmit the location information of the hard disk to the metadata server.

In some embodiments, in response to determining that the target type information is a CMR hard disk, the determination module 620 may determine a service unit of the CMR hard disk to be associated with the target hard disk. Alternatively, in response to determining that the target type information is an SMR hard disk, the determination module 620 may determine a service unit of the SMR hard disk to be associated with the target hard disk.

Embodiment 4

Based on the same invention idea, some embodiments of the present disclosure also provide a device 700 for data processing. Since the device 700 is the device in the method for data processing according to some embodiments of the present disclosure, and the principle of solving the problem of the device 700 is similar to that of the method for data processing, the device 700 may be referred to the implementation of the method, which is not repeated.

Figure 7:
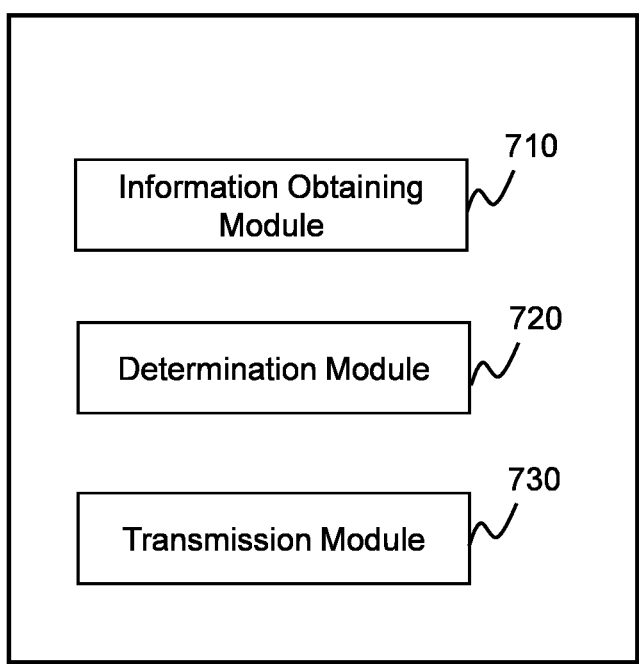
FIG. 7 is a block diagram illustrating an exemplary device for data processing according to some embodiments of the present disclosure.

FIG. 7 is a block diagram illustrating an exemplary device for data processing according to some embodiments of the present disclosure.

As shown in FIG. 7, the device 700 may include an information obtaining module 710, a determination module 720, and a transmission module 730.

The information obtaining module 710 may be configured to obtain information of one or more hard disks of each of one or more data nodes. The information of the one or more hard disks may at least include type information, capacity information, and location information of each of the one or more hard disks.

The determination module 720 may be configured to determine, based on a data processing instruction and the information of the one or more hard disks, target information of a target hard disk among the one or more hard disks.

The transmission module 730 may be configured to transmit the data processing instruction including the target information of the target hard disk to a target data node corresponding to the target hard disk.

In some embodiments, the determination module 720 may determine a data block to be stored based on the data processing instruction; determine a data file type of the data block to be stored; and determine, based on the data file type of the data block to be stored, the target information of the target hard disk among the one or more hard disks.

In some embodiments, in response to determining that the data file type of the data block to be stored is a first data file type, the determination module 720 may further determine, based on a priority strategy, a first hard disk as the target hard disk. Alternatively, in response to determining that the data file type of the data block to be stored is a second data file type, the determination module 720 may determine, based on the priority strategy, a second hard disk as the target hard disk. In some embodiments, the priority strategy may include determining whether capacity information of the first hard disk whose type corresponds to the data file type of the data block satisfies a condition; in response to determining that the capacity information of the first hard disk satisfies the condition, designating the first hard disk as the target hard disk; or in response to determining that the capacity information of the first hard disk whose type corresponds to the data file type of the data block does not satisfy the condition, designating the second hard disk whose type does not correspond to the data file type as the target hard disk.

In some embodiments, the priority strategy may include at least one of a node allocating strategy or a hard disk issuing strategy.

In some embodiments, a life cycle of the data block in the first data file type may be not fixed and capacity occupation of the data block in the first data file type may not exceed a threshold. A life cycle of the data block in the second data file type may be fixed and capacity occupation of the data block in the second data file type may exceeds the threshold. The first hard disk may be a CMR hard disk, and the second hard disk may be an SMR hard disk.

In some embodiments, the data processing instruction may include a data storage instruction. The transmission module 730 may determine whether the data block to be stored is stored in the target hard disk. In response to determining that the data block to be stored is not stored in the target hard disk, the transmission module 730 may update the data storage instruction by replacing the target hard disk with another hard disk whose type does not correspond to the data file type.

In some embodiments, in response to determining that the data block to be stored is stored in a hard disk, the transmission module 730 may obtain location information of the hard disk where the data block is stored, and establish a relationship table based on the location information of the hard disk corresponding to the data block. The relationship table may include a name of a data file, a name of the data block, the location information of the hard disk, etc.

Embodiment 5

Based on the same invention idea, some embodiments of the present disclosure also provide an electronic device 800 for data processing. Since the device 800 is the device in the method for data processing according to some embodiments of the present disclosure, and the principle of solving the problem of the electronic device 800 is similar to that of the method for data processing, the electronic device 800 may be referred to the implementation of the method, which is not repeated.

Figure 8:
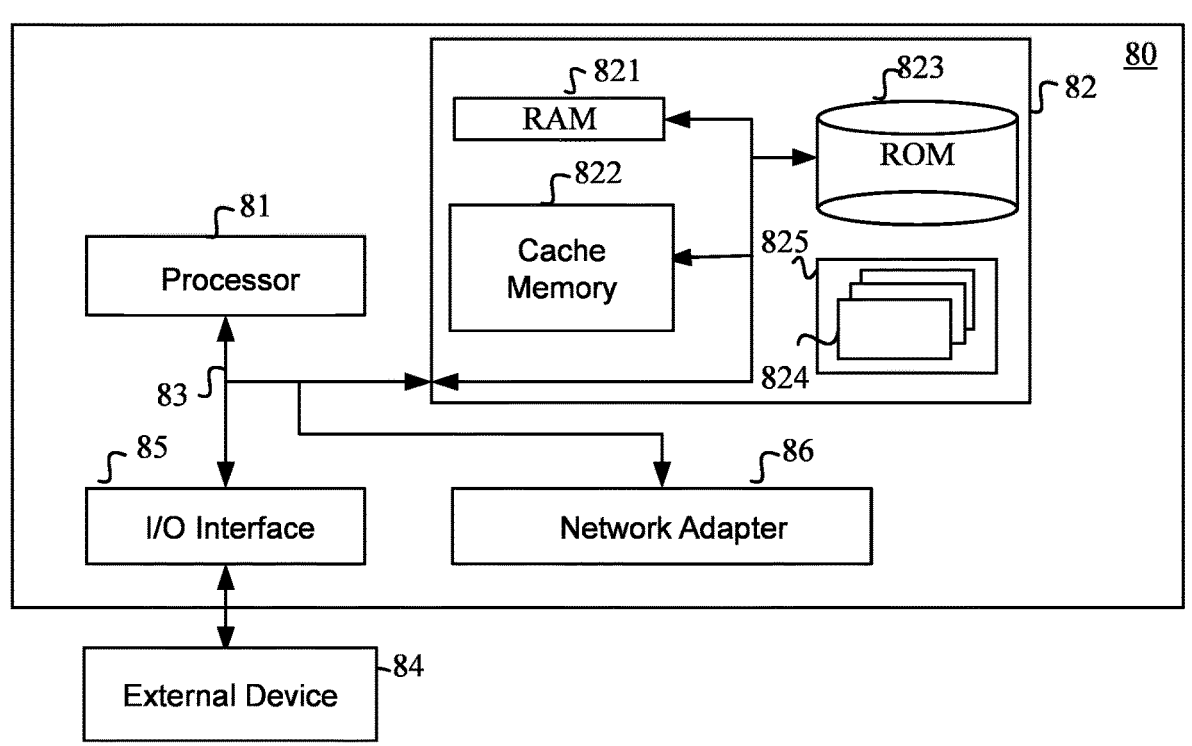
FIG. 8 is a schematic diagram illustrating an exemplary electronic device for data processing according to some embodiments of the present disclosure.

FIG. 8 is a schematic diagram illustrating an exemplary electronic device for data processing according to some embodiments of the present disclosure. The electronic device 80 shown in FIG. 8 may be an example. Thus, the present disclosure is not limited to the embodiments shown, but to be accorded the widest scope consistent with the claims.

As shown in FIG. 8, the electronic device 80 may be expressed in the form of a general computing device, such as a terminal device. Components of the electronic device 80 may include at least one processor 81, at least one storage device 82 storing instructions that can be executed by the at least one processor 81, a bus 83 configured to connect different components (including the at least one processor 81 and the at least one storage device 82).

The at least one processor 81 may implement the method for data processing by executing the instructions.

In some embodiments, a data processing instruction including target information of a target data node corresponding to a target hard disk may be received. The target hard disk in the target data node may be determined based on the data processing instruction.

In some embodiments, the receiving a data processing instruction including target information to a target data node corresponding to a target hard disk may include determining information of one or more hard disks of each of one or more data nodes, the information of the one or more hard disks at least including type information, capacity information, and location information of each of the one or more hard disks; transmitting the information of the one or more hard disks of each of the one or more data nodes to a metadata server; and receiving the data processing instruction including the target information to the target data node corresponding to the target hard disk from the metadata server In some embodiments, before the determining, based on the data processing instruction, the target hard disk in the target data node, the method may include determining, based on the data processing instruction, target type information of the target hard disk; and determining, based on the target type information and a relationship between type information of hard disks and service units, a target service unit corresponding to the target type information.

In some embodiments, the method may further include obtaining a data block to be stored; and processing, based on the data processing instruction, the data block to be stored by retrieving the target service unit corresponding to the target type information.

In some embodiments, the data processing instruction may include a data storage instruction. The method may further include determining, based on the data storage instruction, the target hard disk where the data block in the data storage instruction is stored; and determining, based on the target type information of the target hard disk, the target service unit to store the data block.

In some embodiments, the method may further include determining whether the data block to be stored is stored in the target hard disk; and in response to determining that the data block to be stored is not stored in the target hard disk, obtaining an updated data storage instruction including replacing the target hard disk with another hard disk whose type does not correspond to a data file type of the data block.

In some embodiments, the method may further include, in response to determining that the data block to be stored is stored in a hard disk, obtaining location information of the hard disk; and transmitting the location information of the hard disk to the metadata server.

In some embodiments, the determining, based on the target type information and a relationship between type information of hard disks and service units, a target service unit corresponding to the target type information may include in response to determining that the target type information is a CMR hard disk, determining a service unit of the CMR hard disk to be associated with the target hard disk; or in response to determining that the target type information is an SMR hard disk, determining a service unit of the SMR hard disk to be associated with the target hard disk.

The bus 83 may represent one or more types of bus structures. In some embodiments, the bus 83 may include a storage bus, a storage controller, a peripheral bus, a processor, a local bus, etc., using any of a variety of bus structures.

The at least one storage device 82 may include a readable medium in the form of volatile memory, such as a random access memory (RAM) 821 and/or a cache memory 822. In some embodiments, the at least one storage device 82 may further include read only memory (ROM) 823.

The at least one storage device 82 may also include a program/practical tool 825 including a set of (at least one) program module 824. The program module 824 may include an operating system, one or more applications, other program modules, program data, or the like, or any combination thereof. Each or some combination of the embodiments may include the realization of the network environment.

The electronic device 80 may also communicate with one or more external devices 84 (e.g., a keyboard, a pointing device, etc.). In some embodiments, the electronic device 80 may also communicate with one or more devices that allow a user to interact with the electronic device 80, and/or communicate with any devices that allow one or more computing devices (e.g., a router, a modem, etc.) to interact with the electronic device 80. This communication may be performed by an input/output (I/O) interface 85. In addition, the electronic device 80 may also communicate with one or more networks (e.g., LAN, WAN, and/or public networks, such as the Internet) through a network adapter 86. As shown in FIG. 8, the network adapter 86 may communicate with other modules of the electronic device 80 through the bus 83. It should be understood that other hardware and/or software modules may be used in conjunction with the electronic device 80 (not shown in FIG. 8). The other hardware and/or software modules may include a microcode, a device driver, a redundant processing unit, an external disk driver array, a RAID system, a tape driver, a data backup storage system, or the like, or any combination thereof.

Embodiment 6

Based on the same invention idea, some embodiments of the present disclosure also provide an electronic device 900 for data processing. Since the device 900 is the device in the method for data processing according to some embodiments of the present disclosure, and the principle of solving the problem of the electronic device 900 is similar to that of the method for data processing, the electronic device 900 may be referred to the implementation of the method, which is not repeated.

Figures 9, 10:
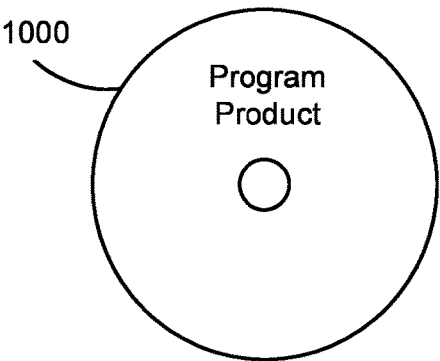
FIG. 9 is a schematic diagram illustrating an exemplary electronic device for data processing according to some embodiments of the present disclosure.
FIG. 10 is a schematic diagram illustrating an exemplary program product for data processing according to some embodiments of the present disclosure.

FIG. 9 is a schematic diagram illustrating an exemplary electronic device for data processing according to some embodiments of the present disclosure. The electronic device 90 shown in FIG. 9 may be an example. Thus, the present disclosure is not limited to the embodiments shown, but to be accorded the widest scope consistent with the claims.

As shown in FIG. 9, the electronic device 90 may be expressed in the form of a general computing device, such as a terminal device. Components of the electronic device 90 may include at least one processor 91, at least one storage device 92 storing instructions that can be executed by the at least one processor 91, a bus 93 configured to connect different components (including the at least one processor 91 and the at least one storage device 92).

The at least one processor 91 may implement the method for data processing by executing the instructions.

Information of one or more hard disks of each of one or more data nodes may be obtained. The information of the one or more hard disks may at least include type information, capacity information, and location information of each of the one or more hard disks. Target information of a target hard disk among the one or more hard disks may be determined based on a data processing instruction and the information of the one or more hard disks. The data processing instruction including the target information of the target hard disk may be transmitted to a target data node corresponding to the target hard disk.

In some embodiments, the determining, based on a data processing instruction and the information of the one or more hard disks, target information of a target hard disk among the one or more hard disks may include determining, based on the data processing instruction, a data block to be stored; determining a data file type of the data block to be stored; and determining, based on the data file type of the data block to be stored, the target information of the target hard disk among the one or more hard disks.

In some embodiments, the determining, based on the data file type of the data block to be stored, the target information of the target hard disk among the one or more hard disks may include in response to determining that the data file type of the data block to be stored is a first data file type, determining, based on a priority strategy, a first hard disk as the target hard disk; or in response to determining that the data file type of the data block to be stored is a second data file type, determining, based on the priority strategy, a second hard disk as the target hard disk. The priority strategy may include determining whether capacity information of the first hard disk whose type corresponds to the data file type of the data block satisfies a condition; in response to determining that the capacity information of the first hard disk satisfies the condition, designating the first hard disk as the target hard disk; or in response to determining that the capacity information of the first hard disk whose type corresponds to the data file type of the data block does not satisfy the condition, designating the second hard disk whose type does not correspond to the data file type as the target hard disk.

In some embodiments, the priority strategy may include at least one of a node allocating strategy or a hard disk issuing strategy.

In some embodiments, a life cycle of the data block in the first data file type may not be fixed and capacity occupation of the data block in the first data file type may not exceed a threshold. A life cycle of the data block in the second data file type may be fixed and capacity occupation of the data block in the second data file type may exceed the threshold. The first hard disk may be a CMR hard disk, and the second hard disk may be an SMR hard disk.

In some embodiments, the data processing instruction may include a data storage instruction. The method may further include determining whether the data block to be stored is stored in the target hard disk; and in response to determining that the data block to be stored is not stored in the target hard disk, updating the data storage instruction by replacing the target hard disk with another hard disk whose type does not correspond to the data file type.

In some embodiments, the method may further include in response to determining that the data block to be stored is stored in a hard disk, obtaining location information of the hard disk where the data block is stored; and establishing, based on the location information of the hard disk corresponding to the data block, a relationship table including a name of a data file, a name of the data block, and the location information of the hard disk.

The bus 93 may represent one or more types of bus structures. In some embodiments, the bus 93 may include a storage bus, a storage controller, a peripheral bus, a processor, a local bus, etc., using any of a variety of bus structures.

The at least one storage device 92 may include a readable medium in the form of volatile memory, such as a random access memory (RAM) 921 and/or a cache memory 922. In some embodiments, the at least one storage device 92 may further include read only memory (ROM) 923.

The at least one storage device 92 may also include a program/practical tool 925 including a set of (at least one) program module 924. The program module 924 may include an operating system, one or more applications, other program modules, program data, or the like, or any combination thereof. Each or some combination of the embodiments may include the realization of the network environment.

The electronic device 90 may also communicate with one or more external devices 94 (e.g., a keyboard, a pointing device, etc.). In some embodiments, the electronic device 90 may also communicate with one or more devices that allow a user to interact with the electronic device 90, and/or communicate with any devices that allow one or more computing devices (e.g., a router, a modem, etc.) to interact with the electronic device 90. This communication may be performed by an input/output (I/O) interface 95. In addition, the electronic device 90 may also communicate with one or more networks (e.g., LAN, WAN, and/or public networks, such as the Internet) through a network adapter 96. As shown in FIG. 9, the network adapter 96 may communicate with other modules of the electronic device 90 through the bus 93. It should be understood that other hardware and/or software modules may be used in conjunction with the electronic device 90 (not shown in FIG. 9). The other hardware and/or software modules may include a microcode, a device driver, a redundant processing unit, an external disk driver array, a RAID system, a tape driver, a data backup storage system, or the like, or any combination thereof.

Embodiment 7

In some embodiments, aspects of the present disclosure may also be realized as a form of program products, including program codes. When the program product is executed on a terminal device, the program codes may be used to enable the terminal device to execute operations and/or processed described in the "Embodiment" of the present disclosure. For example, the terminal device may include an instruction receiving module and a determination module. The instruction receiving module may be configured to receive a data processing instruction including target information of a target data node corresponding to a target hard disk. The determination module may be configured to determine, based on the data processing instruction, the target hard disk in the target data node.

The program product may include any combination of one or more readable media. A readable medium may be a readable signal medium or a readable storage medium. The readable storage medium may include systems, devices, equipment, or the like, or any combination thereof, of electrical, magnetic, light, electromagnetic, infrared, semiconductor, etc. Exemplary readable storage media may include an electrical connection including one or more leads, a portable disk, a hard disk, a random access memory (RAM), a read only memory (ROM), an erasable programmable read only memory (EPROM or Flash), an optical fiber, a portable compact disc read only memory (CD- ROM), an optical storage device, a magnetic storage device, or the like, or any combination thereof.

As shown in FIG. 10, a program product 1000 may be used for data processing according to some embodiments of the present disclosure. For example, the program product 1000 may adopt a CD-ROM including program codes, and may be executed on a terminal device (e.g., a personal computer). However, the disclosed program product may not be limited herein. In the present disclosure, the readable storage medium may be any tangible medium containing or storing a program. The program may be used to execute the system, device, equipment, or any combination thereof.

The readable signal medium may include a data signal that is transmitted in the baseband or as a portion of a carrier. The readable signal medium may include a readable program code. The transmitted data signal may adopt a variety of forms. For example, the transmitted data signal may include an electromagnetic signal, a light signal, or any combination thereof. The readable signal medium may also be any readable medium other than the readable storage medium. The readable medium may be used to send, disseminate, or transmit a program performed on the system, the device, the equipment, or any combination thereof.

The program code contained in the readable medium may be transmitted through any proper media. Exemplary media may include wireless, wired, optical cables, radio frequency (RF), or the like, or any combination thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for data processing implemented on a computing device having at least one processor and at least one storage device, comprising:
obtaining information of one or more hard disks of each of a plurality of data nodes, the information of the one or more hard disks at least including type information, capacity information, and location information of each of the one or more hard disks;

determining, based on a data processing instruction, a data block to be stored, the data processing instruction being received from a metadata server;
determining a data file type of the data block to be stored;
determining target information of a target hard disk among the one or more hard disks based on the data file type of the data block to be stored, the information of the one or more hard disks, and a priority strategy; and
transmitting the data processing instruction including the target information of the target hard disk to a target data node corresponding to the target hard disk, wherein the priority strategy includes a node allocating strategy and a hard disk issuing strategy, and the node allocating strategy includes:
determining one or more points on a load ring corresponding to each of the plurality of data nodes and a point on the load ring corresponding to the data block to be stored; and
determining the target data node based on the corresponding points on the load ring according to a preset rule, wherein
the corresponding points of the data nodes on the load ring are determined by performing a hash operation on features of the data nodes, and
the preset rule includes starting from the corresponding point of the data block to be stored on the load ring, traversing the points on the load ring in a clockwise or counterclockwise order, and determining a data node corresponding to the corresponding point traversed at first on the load ring as the target data node, and the hard disk issuing strategy includes:
determining a priority value of each of the one or more hard disks in the target data node, the priority value of the hard disk indicating a priority degree of storing the data block in the hard disk; and
determining a hard disk with a maximum priority value as the target hard disk and the corresponding location information of the target hard disk, wherein the priority value of the hard disk is related to a data increment of the hard disk, the data increment of the hard disk refers to an amount of data newly stored in the hard disk within a preset time period, and the smaller the data increment of the hard disk is, the larger the priority value of the hard disk is, and
the determining a priority value of each of the one or more hard disks in the target data node includes:
obtaining the priority value of the hard disk by weighting, based on a weight vector, an available capacity of the hard disk, a read and write load of the hard disk, the data increment of the hard disk, and a fragmentation rate of the hard disk, wherein the weight vector includes a weight of the available capacity of the hard disk, a weight of the read and write load of the hard disk, a weight of the data increment of the hard disk, and a weight of the fragmentation rate of the hard disk.

2. The method of claim 1, wherein the determining target information of a target hard disk among the one or more hard disks based on the data file type of the data block to be stored, the information of the one or more hard disks, and a priority strategy further includes:
in response to determining that the data file type of the data block to be stored is a first data file type, determining, based on the priority strategy, a first hard disk as the target hard disk; or
in response to determining that the data file type of the data block to be stored is a second data file type, determining, based on the priority strategy, a second hard disk as the target hard disk, wherein the priority strategy further includes:

determining whether capacity information of the first hard disk whose type corresponds to the data file type of the data block satisfies a condition;

in response to determining that the capacity information of the first hard disk satisfies the condition, designating the first hard disk as the target hard disk; or in response to determining that the capacity information of the first hard disk whose type corresponds to the data file type of the data block does not satisfy the condition, designating the second hard disk whose type does not correspond to the data file type as the target hard disk.

3. The method of claim 2, wherein a life cycle of the data block in the first data file type is not fixed and capacity occupation of the data block in the first data file type does not exceed a threshold, a life cycle of the data block in the second data file type is fixed and capacity occupation of the data block in the second data file type exceeds the threshold, the first hard disk is a conventional magnetic recording (CMR) hard disk, and the second hard disk is a shingled magnetic recording (SMR) hard disk.

4. The method of claim 1, wherein the data processing instruction includes a data storage instruction, and the method further includes:

determining whether the data block to be stored is stored in the target hard disk; and in response to determining that the data block to be stored is not stored in the target hard disk, updating the data storage instruction by replacing the target hard disk with another hard disk whose type does not correspond to the data file type.

5. The method of claim 4, further comprising:

in response to determining that the data block to be stored is stored in a hard disk, obtaining location information of the hard disk where the data block is stored; and establishing, based on the location information of the hard disk corresponding to the data block, a relationship table including a name of a data file, a name of the data block, and the location information of the hard disk.

6. A system for data processing, comprising:

at least one storage device including a set of instructions; and at least one processor in communication with the at least one storage device, wherein when executing the set of instructions, the at least one processor is directed to perform operations including:

obtaining information of one or more hard disks of each of a plurality of data nodes, the information of the one or more hard disks at least including type information, capacity information, and location information of each of the one or more hard disks;

determining, based on a data processing instruction, a data block to be stored, the data processing instruction being received from a metadata server;

determining a data file type of the data block to be stored;

determining target information of a target hard disk among the one or more hard disks based on the data file type of the data block to be stored, the information of the one or more hard disks, and a priority strategy; and transmitting the data processing instruction including the target information of the target hard disk to a target data node corresponding to the target hard disk, wherein the priority strategy includes a hard disk issuing strategy, and the hard disk issuing strategy includes:

determining a priority value of each of the one or more hard disks in the target data node, the priority value of the hard disk indicating a priority degree of storing the data block in the hard disk; and determining a hard disk with a maximum priority value as the target hard disk and the corresponding location information of the target hard disk, wherein the priority value of the hard disk is related to a data increment of the hard disk, the data increment of the hard disk refers to an amount of data newly stored in the hard disk within a preset time period, and the smaller the data increment of the hard disk is, the larger the priority value of the hard disk is, and the determining a priority value of each of the one or more hard disks in the target data node includes:

obtaining the priority value of the hard disk by weighting, based on a weight vector, an available capacity of the hard disk, a read and write load of the hard disk, the data increment of the hard disk, and the fragmentation rate of the hard disk, wherein the weight vector includes a weight of the available capacity of the hard disk, a weight of the read and write load of the hard disk, a weight of the data increment of the hard disk, and a weight of the fragmentation rate of the hard disk.

7. A method for data processing implemented on a computing device having at least one processor and at least one storage device, comprising:

receiving a data processing instruction including target information to a target data node corresponding to a target hard disk; and determining, based on the data processing instruction, the target hard disk in the target data node, wherein the target information is determined by:

obtaining information of one or more hard disks of each of a plurality of data nodes, the information of the one or more hard disks at least including type information, capacity information, and location information of each of the one or more hard disks;

determining, based on a data processing instruction, a data block to be stored, the data processing instruction being received from a metadata server;

determining a data file type of the data block to be stored; and determining target information of the target hard disk among the one or more hard disks based on the data file type of the data block to be stored, the information of the one or more hard disks, and a priority strategy, wherein the priority strategy includes a hard disk issuing strategy, and the hard disk issuing strategy includes:

determining a priority value of each of the one or more hard disks in the target data node, the priority value of the hard disk indicating a priority degree of storing the data block in the hard disk; and determining a hard disk with a maximum priority value as the target hard disk and the corresponding location information of the target hard disk, wherein the priority value of the hard disk is related to a data increment of the hard disk, the data increment of the hard disk refers to an amount of data newly stored in the hard disk within a preset time period, and the smaller the data increment of the hard disk is, the larger the priority value of the hard disk is, and the determining a priority value of each of the one or more hard disks in the target data node includes:

obtaining the priority value of the hard disk by weighting, based on a weight vector, an available capacity of the hard disk, a read and write load of the hard disk, the data increment of the hard disk, and the fragmentation rate of the hard disk, wherein the weight vector includes a weight of the available capacity of the hard disk, a weight of the read and write load of the hard disk, a weight of the data increment of the hard disk, and a weight of the fragmentation rate of the hard disk.

8. The method of claim 7, wherein the receiving a data processing instruction including target information to a target data node corresponding to a target hard disk includes:

determining the information of the one or more hard disks of each of a plurality of data nodes, the information of the one or more hard disks at least including the type information, the capacity information, and the location information of each of the one or more hard disks;

transmitting the information of the one or more hard disks of each of the one or more data nodes to a metadata server; and receiving the data processing instruction including the target information to the target data node corresponding to the target hard disk from the metadata server.

9. The method of claim 7, wherein before the determining, based on the data processing instruction, the target hard disk in the target data node, the method includes:

determining, based on the data processing instruction, target type information of the target hard disk; and determining, based on the target type information and a relationship between type information of hard disks and service units, a target service unit corresponding to the target type information.

10. The method of claim 9, further comprising:

obtaining the data block to be stored; and processing, based on the data processing instruction, the data block to be stored by retrieving the target service unit corresponding to the target type information.

11. The method of claim 9, wherein the data processing instruction includes a data storage instruction, and the method further includes:

determining, based on the data storage instruction, the target hard disk where the data block in the data storage instruction is stored; and determining, based on the target type information of the target hard disk, the target service unit to store the data block.

12. The method of claim 11, further comprising:

determining whether the data block to be stored is stored in the target hard disk; and in response to determining that the data block to be stored is not stored in the target hard disk, obtaining an updated data storage instruction including replacing the target hard disk with another hard disk whose type does not correspond to a data file type of the data block.

13. The method of claim 12, further comprising:

in response to determining that the data block to be stored is stored in a hard disk, obtaining location information of the hard disk; and transmitting the location information of the hard disk to the metadata server.

14. The method of claim 10, wherein the determining, based on the target type information and a relationship between type information of hard disks and service units, a target service unit corresponding to the target type information includes:

in response to determining that the target type information is a conventional magnetic recording (CMR) hard disk, determining a service unit of the CMR hard disk to be associated with the target hard disk; or in response to determining that the target type information is a shingled magnetic recording (SMR) hard disk, determining a service unit of the SMR hard disk to be associated with the target hard disk.

15. The method of claim 1, wherein in response to the type of the data block to be stored as a first data file type, the priority value of the hard disk is related to a fragmentation rate of the hard disk, the fragmentation rate of the hard disk referring to a proportion of file fragmentation in the hard disk.

16. The method of claim 1, wherein the weight vector is determined based on a weight determination model, wherein an input of the weight determination model includes scale information and load information, and an output of the weight determination model includes the weight vector.

17. The method of claim 16, wherein the scale information refers to information related to a scale of a distributed storage cluster including the plurality of data nodes, and the scale information includes a number of data nodes of the distributed storage cluster, a total number of hard disks of the distributed storage cluster, and a total capacity of the hard disks of the distributed storage cluster.

18. The method of claim 16, wherein the weight determination model is obtained by training an initial weight determination model using training samples and corresponding labels, wherein the training samples include historical scale information and historical load information, and the labels include weight vectors corresponding to the historical scale information and historical load information.

19. The method of claim 18, wherein the labels of the training samples are determined based on an operation stability and an operation efficiency of a distributed storage cluster including the plurality of data nodes, and a weight vector corresponding to a training sample with high operation stability and high operation efficiency is determined as the label of the training sample.

20. The system of claim 6, wherein the priority strategy further includes a node allocating strategy a hard disk issuing strategy, and the node allocating strategy includes:

determining one or more points on a load ring corresponding to each of the plurality of data nodes and a point on the load ring corresponding to the data block to be stored; and determining the target data node based on the corresponding points on the load ring according to a preset rule, wherein the corresponding points of the data nodes on the load ring are determined by performing a hash operation on features of the data nodes, and

the preset rule includes starting from the corresponding point of the data block to be stored on the load ring, traversing the points on the load ring in a clockwise or counterclockwise order, and determining a data node corresponding to the corresponding point tra- versed at first on the load ring as the target data node.

\* \* \* \* \*

36